United States Patent
Piazza

(10) Patent No.: US 7,603,544 B2
(45) Date of Patent: Oct. 13, 2009

(54) DYNAMIC ALLOCATION OF A BUFFER ACROSS MULTIPLE CLIENTS IN MULTI-THREADED PROCESSOR WITHOUT PERFORMING A COMPLETE FLUSH OF DATA ASSOCIATED WITH ALLOCATION

(75) Inventor: Thomas A. Piazza, Granite Bay, CA (US)

(73) Assignee: Intel Corporation, Santa Clara, CA (US)

( * ) Notice: Subject to any disclaimer, the term of this patent is extended or adjusted under 35 U.S.C. 154(b) by 507 days.

(21) Appl. No.: 11/224,643

(22) Filed: Sep. 12, 2005

(65) Prior Publication Data

US 2006/0161757 A1 Jul. 20, 2006

Related U.S. Application Data

(60) Provisional application No. 60/638,427, filed on Dec. 23, 2004.

(51) Int. Cl.
*G06F 12/00* (2006.01)
*G06F 9/312* (2006.01)
*G06F 9/22* (2006.01)

(52) U.S. Cl. .............. 712/233; 710/3; 710/29; 710/200; 710/310; 712/216; 712/234; 712/235; 712/236; 712/214; 712/215; 712/244; 711/171

(58) Field of Classification Search .............. 710/1, 710/3, 5, 8–10, 32–34, 29, 200, 310; 712/244, 712/239, 214–216, 233–236
See application file for complete search history.

(56) References Cited

U.S. PATENT DOCUMENTS

| | | | |
|---|---|---|---|
| 6,070,202 A | 5/2000 | Minkoff et al. | |
| 6,222,550 B1 | 4/2001 | Rosman et al. | |
| 6,330,664 B1 * | 12/2001 | Halvarsson | 712/239 |
| 6,539,464 B1 | 3/2003 | Getov | |
| 6,708,284 B2 * | 3/2004 | Smith | 714/10 |
| 6,978,360 B2 * | 12/2005 | Bilardi et al. | 712/225 |
| 7,213,135 B2 * | 5/2007 | Burky et al. | 712/244 |

(Continued)

FOREIGN PATENT DOCUMENTS

| | | |
|---|---|---|
| CN | 1427342 A | 7/2003 |
| EP | 0 817 044 A2 | 1/1998 |

OTHER PUBLICATIONS

European Patent Office, International Search Report and Written Opinion for International Application No. PCT/US2005/037624, 12 pages, Apr. 13, 2006.

(Continued)

*Primary Examiner*—Tammara Peyton
(74) *Attorney, Agent, or Firm*—Trop, Pruner & Hu, P.C.

(57) ABSTRACT

A method may include distributing ranges of addresses in a memory among a first set of functions in a first pipeline. The first set of the functions in the first pipeline may operate on data using the ranges of addresses. Different ranges of addresses in the memory may be redistributed among a second set of functions in a second pipeline without waiting for the first set of functions to be flushed of data.

16 Claims, 7 Drawing Sheets

U.S. PATENT DOCUMENTS

| | | |
|---|---|---|
| 7,469,407 B2 * | 12/2008 | Burky et al. .................. 718/104 |
| 7,490,221 B2 * | 2/2009 | Evans et al. ................... 712/34 |
| 2002/0125501 A1 | 9/2002 | Dicks |
| 2002/0169947 A1 | 11/2002 | Bilardi et al. |
| 2003/0084259 A1 | 5/2003 | Palanca et al. |
| 2003/0159021 A1 | 8/2003 | Kerr et al. |

OTHER PUBLICATIONS

PRC Patent Office, Office Action for corresponding PRC Patent Application 200510132501.6, 13 pgs., May 9, 2008.

German Patent Office, Office Action issued in corresponding German Application No. 11 2005 003 222.1-53, 5 pages, Oct. 27, 2008.

* cited by examiner

| Southbound HPBI | | |
|---|---|---|
| Control (2 bits) | | Data (14 bits) |
| | 0 = No Data Valid | NA |
| | 1 = Fence Top | 10 bits Data, 4 bits FF ID |
| | 2 = Fence Bottom | 10 bits Data, 4 bits FF ID |
| | 3 = Address For Ownership | 10 bits |
| Northbound HPBI | | |
| Control (2 bits) | | Data (10 bits) |
| | 0 = No Data Valid | NA |
| | 1 = Flip Accepted | NA |
| | 2 = Reserved | NA |
| | 3 = Address For Ownership | 10 Bits |
| Southbound LPBI | | |
| Control (3 bits) | | Data (16 bits) |
| | 0 = No Data Valid | NA |
| | 1 = "Free Address" | 10 bits |
| | 2 = Flip State | NA |
| | 3 = URB Address / Count | 10 bits Adrs, 6 bits Count |
| | 4 = ID Pointer phase 0 | 16 bits (LSB) |
| | 5 = ID Pointer phase 1 | 16 bits (MSB) |
| Northbound LPBI | | |
| Control (2 bits) | | Data (10 bits) |
| | 0 = No Data Valid | NA |
| | 1 = "Free Address" | 10 bits |
| | 2 = URB Write Complete | 10 bits |

Fig. 7

DYNAMIC ALLOCATION OF A BUFFER ACROSS MULTIPLE CLIENTS IN MULTI-THREADED PROCESSOR WITHOUT PERFORMING A COMPLETE FLUSH OF DATA ASSOCIATED WITH ALLOCATION

CROSS-REFERENCE TO RELATED APPLICATION

The present application claims the benefit of U.S. provisional application Ser. No. 60/638,427, filed Dec. 23, 2004, entitled "Dynamic Allocation Of A Buffer Across Multiple Clients In A Threaded Processor," the entire content of which is incorporated by reference herein.

BACKGROUND

Implementations of the claimed invention generally may relate to allocation of memory and, more particularly, to dynamic allocation of memory among processes.

In data processing, sometimes a memory is logically partitioned for use by a number of processes. If four processes are running, for example, the memory may be partitioned into four portions corresponding to each of the processes. If the processes are related (e.g., as parts of a pipeline process), such partitioning scheme may allocate each process some minimum amount of the memory to prevent deadlock. The remaining amount of the memory above this aggregate minimum amount may be allocated among the processes to facilitate greater performance by the processes.

When the number of processes using a memory changes, it may be desirable to change the allocation of the memory to optimize for the new number of processes (e.g., three or five, instead of the four processes in the above example). Some or all of the existing processes, however, may have associated data in the memory, and such data may fall into another process's portion of the memory or may be orphaned if its process is discontinued. Thus, the memory is typically flushed (e.g., emptied of data) before it may be re-partitioned among the new number of processes. In some cases, the in-process data may be immediately deleted/flushed from the memory and reloaded as appropriate under the new partitioning scheme. In other cases, the in-process data may be implicitly flushed from the memory by allowing the processes to completely process it before repartitioning the memory.

Regardless of the scheme used for flushing, however, flushing the memory may adversely affect performance of the processes. Flushing the memory before partitioning or allocation may delay the processing of data by the old processes, the new processes, or both.

BRIEF DESCRIPTION OF THE DRAWINGS

The accompanying drawings, which are incorporated in and constitute a part of this specification, illustrate one or more implementations consistent with the principles of the invention and, together with the description, explain such implementations. The drawings are not necessarily to scale, the emphasis instead being placed upon illustrating the principles of the invention. In the drawings.

FIG. 7 illustrates exemplary message formats.

DETAILED DESCRIPTION

The following detailed description refers to the accompanying drawings. The same reference numbers may be used in different drawings to identify the same or similar elements. In the following description, for purposes of explanation and not limitation, specific details are set forth such as particular structures, architectures, interfaces, techniques, etc. in order to provide a thorough understanding of the various aspects of the claimed invention. However, it will be apparent to those skilled in the art having the benefit of the present disclosure that the various aspects of the invention claimed may be practiced in other examples that depart from these specific details. In certain instances, descriptions of well known devices, circuits, and methods are omitted so as not to obscure the description of the present invention with unnecessary detail.

Figure 1:
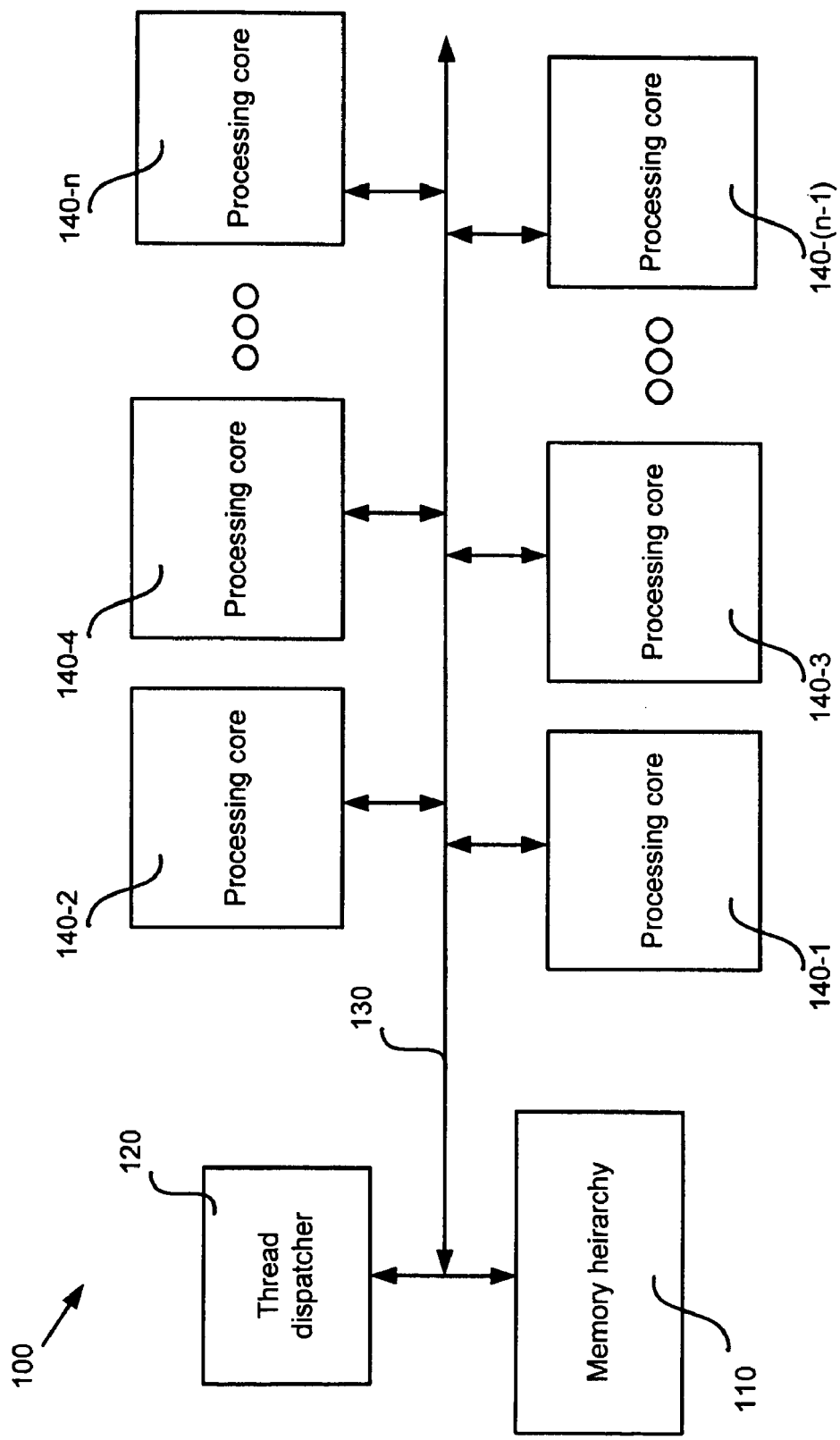
FIG. 1 illustrates an example system.

FIG. 1 illustrates an example system 100. System 100 may include a memory hierarchy 110, a thread dispatcher 120, a bus 130, and processing cores 140-1 to 140-n (collectively "processing cores 140"). System 100 may include multiple processing cores 140 that support multi-threaded execution. In some implementations, each of processing cores 140 may support one or multiple threads. Multi-threading on a single processor (e.g., core 140-1) may achieve efficient execution by allowing active threads to be executed while other threads are in inactive state.

Memory hierarchy 110 may store data and instructions to be used during execution by one or more processing cores 140. Memory hierarchy 110 may include dynamic random access memory (DRAM), one or more levels of instruction cache, one or more levels of data cache, and/or one or more levels of shared instruction and data cache.

Thread dispatcher 120, which is coupled to memory hierarchy 110, may receive information, such as an instruction pointer and data and/or a data pointer, that is associated with a new thread. Thread dispatcher 120 may be coupled with processing cores 140 via bus 130. Thread dispatcher 120 may manage the thread resources of processing cores 140. Upon receiving a new pending thread, thread dispatcher 120 may select one processing core (e.g., core 140-3) that has resources available to execute the pending thread and dispatches the thread to the selected core via bus 130. Upon the completion of an existing thread by a processing core, thread dispatcher 120 is informed and releases thread resource on that processing core for future threads.

Figure 2:
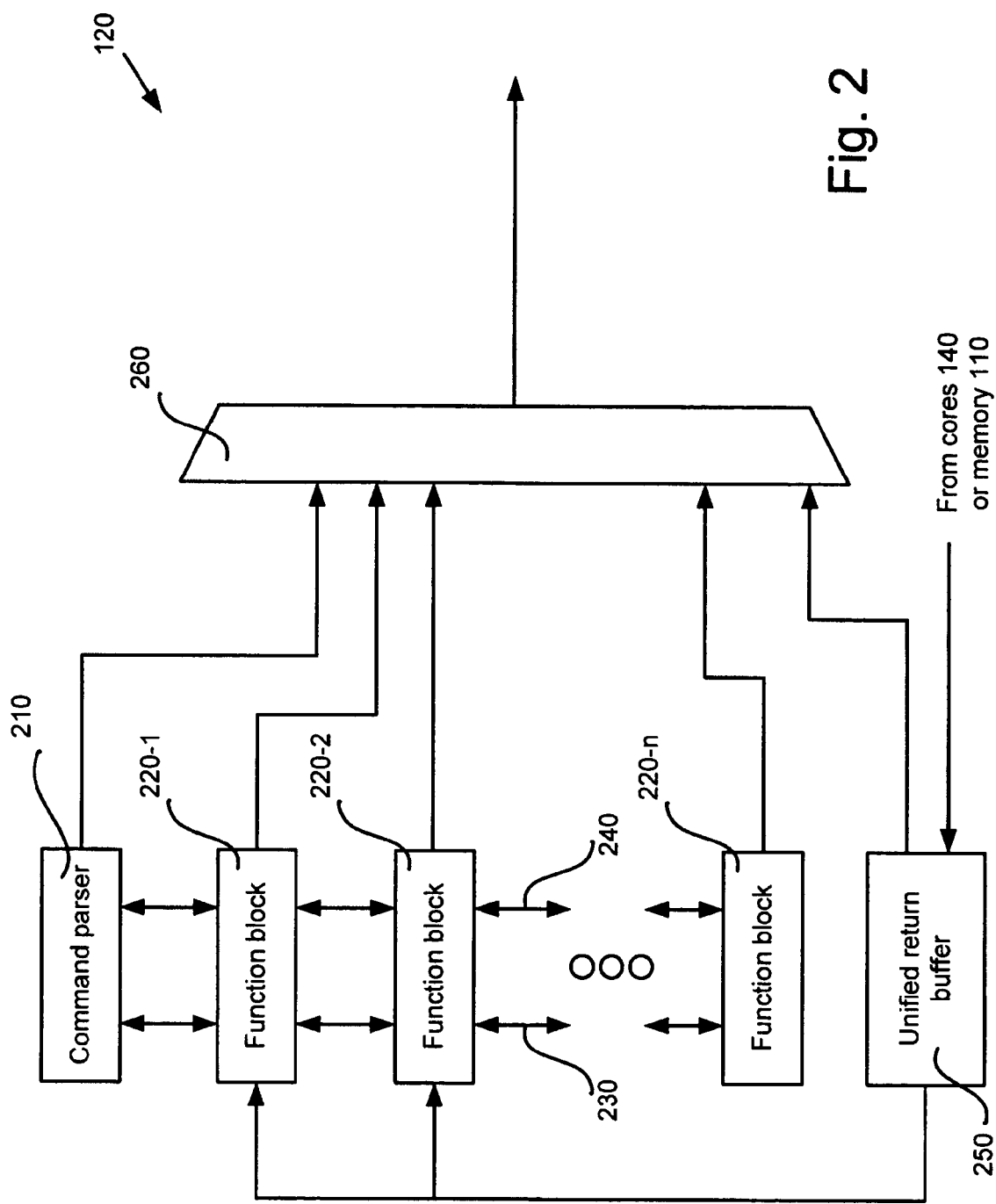
FIG. 2 illustrates a thread dispatcher in the example system of FIG. 1.

FIG. 2 illustrates one possible implementation of thread dispatcher 120. Thread dispatcher 120 may include a command parser 210, a number of function blocks 220-1, 220-2, . . . , 220-n (collectively "function blocks 220"), a high priority bus interface (HPBI) 230, a low priority bus interface (LPBI) 240, a unified return buffer (URB) 250, and a dispatcher 260.

Command parser 210 may translate certain commands and requests into a format that function blocks 220 may process. For example, command parser 210 may break up a single command that concerns a number of function blocks 220 into a number of commands and/or instructions that may be routed to individual function blocks 220.

Function blocks 220 may perform different functions, perhaps in a pipelined manner. In some implementations, function blocks 220 may implement fixed graphical functions, such as one or more vertex shaders, a tessalator, a geometry shader, a clipper, a setup module, and a windower. Some of these fixed functions (e.g., some functional blocks 220) may be active at any given time, and other functions (e.g., other functional blocks 220) may be inactive. Each of the active function blocks 220 may use some designated portion of (e.g., group of addresses in) unified return buffer 250 for its outputs.

Figure 3:
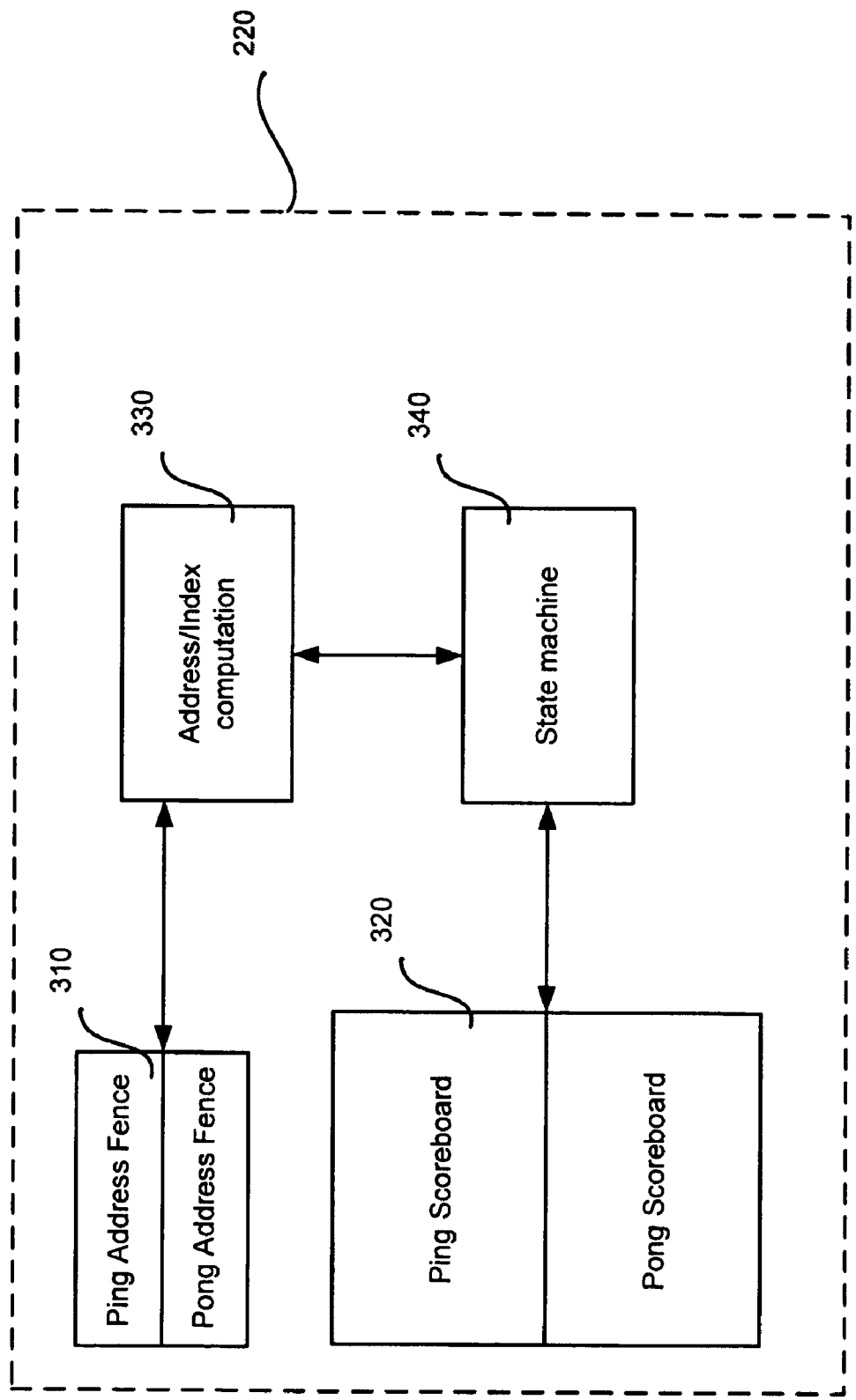
FIG. 3 illustrates a function block in the thread dispatcher of FIG. 2.

FIG. 3 illustrates one possible implementation of function block 220. Function block 220 may include a set of address fences 310, a set of scoreboards 320, an address/index computation unit 330, and a state machine 340.

Address fences 310 may include a ping/pong set of address fences, each fence having a Top register and Bottom register. The Top and Bottom registers may store addresses that define a range of addresses in URB 250 where function block 220 may store items. As used herein, "pong" may denote an alternate set (e.g., a "new" set) in contrast to "ping" that denotes another set (e.g., an "old" or prior set). In the context of address fences 310, an initial set of Top and Bottom fence values may be stored in the Ping fence registers, and when a replacement set of values arrives, it may be stored in the Pong fence registers. If another replacement set of Top and Bottom values arrives, it may be stored in the Ping fence registers, the Pong fence having the most recent values, and so forth.

Scoreboards 320 may include a ping scoreboard and a pong scoreboard, each scoreboard having one bit per address tracked in URB 250. Scoreboard may be large enough so that it may encompass the maximum foreseeable allocation of URB 250's entries for that function block 220. Hence, if a given function block 220 may only be allocated 20% of URB 250, scoreboards 320 may be sized to 2 bits per entry (1 each for Ping and Pong) of that amount of URB 250.

Address/index computation unit 330 may include logic to compute an address from an index or vice versa. As used herein, an "index" may denote a number (e.g., beginning at 0 and ending at the size of the address fence 310) denoting a relative position within the range of addresses defined by address fence 310. For an address within address fence 310 of a function block 220, a corresponding index to that address may be computed as follows: Index=Address−Top, where Top denotes an upper end of the address fence 310. Similarly, unit 330 may compute an address from an index value as follows: Address=Top+Index. Instances where address/index computation unit 330 is used will be described below.

State machine 340 may perform a reallocation on scoreboards 320 upon a change between address fences 310. Such reallocation will be described in greater detail below. State machine 340 may also perform other address processing, such as determining whether to keep or pass along a given address. State machine 340 may also perform other control and/or bookkeeping functions for function block 220.

Returning to FIG. 2, function blocks 220 may be interconnected by two bi-directional busses: HPBI 230 and LPBI 240. In each of HPBI 230 and LPBI 240, two point to point interfaces may span between each function block 220, one going "North", the other going "South." For example, addresses may be passes addressed down from an nth function block 220 FB[n] to an (n+1)th function block 220 FB[n+1] over the Southbound interface of HPBI 230 and/or LPBI 240. Similarly, FB[n+1] may pass addresses up to FB[n] over the Northbound interface of HPBI 230 and/or LPBI 240. Addresses issued to transfer ownership between function blocks 220 may be passed on HPBI 230. Addresses issued to generate payloads and/or addresses being returned to the producer function block 220 may be passed on the LPBI.

HPBI 230 and LPBI 240 may be physically implemented in several ways. In some implementations, two interfaces may be used in each direction in parallel. In some implementations, one interface in each direction may be used with 2 virtual channels therein. If the virtual channel mechanism is implemented, virtual channel #1, for example, may be higher priority (e.g., HPBI 230) than virtual channel #0, which may be used for LPBI 240. In some implementations, HPBI 230, LPBI 240, or both may be flow controlled.

URB 250 may be arranged to hold data associated with function blocks 220 before and/or after processing by processing cores 140. As described herein, URB 250 may be partitioned and shared by function blocks 220 by virtue of the respective address fences 310 therein. In some implementations, URB 250 may have 1024 entries or less, although the claimed invention is not necessarily limited in this regard.

Dispatcher 260 may dispatch threads from function blocks 220 to processing cores 140 via bus 130. In some implementations, dispatcher 260 may determine which one among the cores 140 to send a particular thread to. In some implementations, dispatcher 260 may route a thread to a particular processing core 250 that was specified by the originating function block 220.

Returning to FIG. 1, bus 130 may include a number of communication links among memory hierarchy 110, thread dispatcher 120, and processing cores 140. For ease of explanation, bus 130 is presented as a single line, but in practice bus 130 may include one or more control busses, data busses, etc. Bus 130 may carry data from thread dispatcher 120 for processing by cores 140, and it may also carry processed data from cores 140 to thread dispatcher 120 and/or memory hierarchy 110.

System 100 may also include multiple processing cores 140, each of which include execution circuits with associated control circuitry. Processing cores 140 may be identical or may have varying functionality. Any number of processor cores 140-1 to 140-n may be included in system 100. In some implementations, processor cores 140 may be arranged in rows, each row having an associated row controller.

Figure 4:
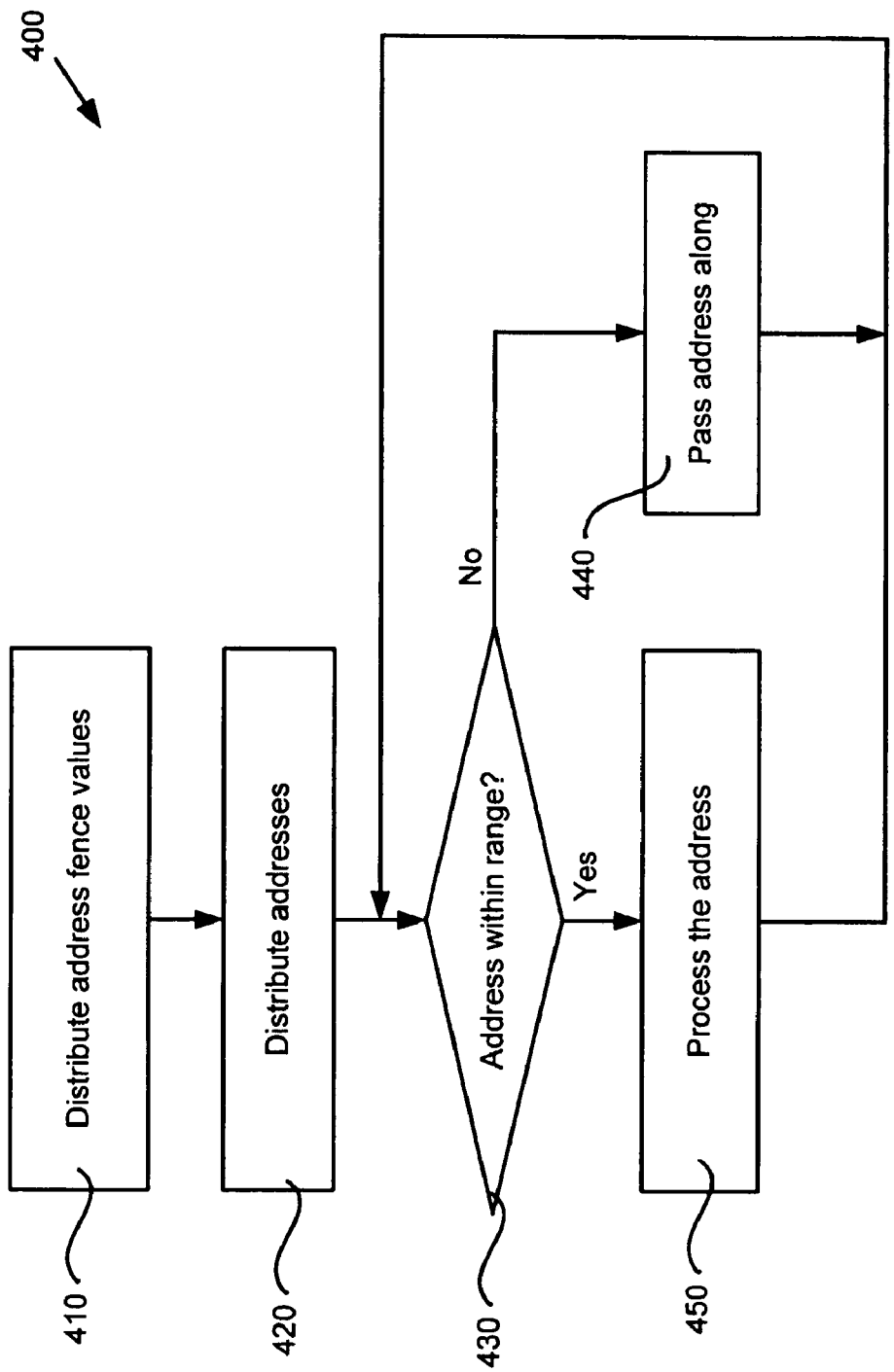
FIG. 4 is a flow chart illustrating a process of initially allocating addresses in a buffer among function blocks.

FIG. 4 is a flow chart illustrating a process 400 of initially allocating addresses in buffer 250 among function blocks (FBs) 220. Upon startup of system 100, or after a reset and/or flush, it may be assumed that all scoreboards 320 in all FBs 220 are cleared, and that the Top/Bottom fence registers 310 are in a "don't care" state. The first sequence of data read from a command stream in thread dispatcher 120 may include a list of Top/Bottom fence values for each of the FBs 220.

Processing may begin by distributing these Top/Bottom fence values among FBs 220 [act 410]. These Top/Bottom fence register values may be successively pipelined through FBs 220 over HPBI 230. In some implementations, for example, the FB 220-1 may store the first Top/Bottom pair in its address fence 310, and may pass the remainder of the fence values down to FB 201-2. FB 220-2 may store the top pair of remaining values in its address fence 310, and may pass the remainder to FB 220-3 over HPBI 230, and so forth. The last function block 220-n may consume the last Top/Bottom pair.

Following in the command stream may be a list of addresses that are being allocated among FBs 220 [act 420]. The list of addresses may be input into the first FB 220-1 over HPBI 230. FB 220-1 may looks at a given addresses and determine if it is within its address range in address fence 310 [act 430].

If the address is not within the address fence 310 of FB 220-1, then it is passed to the next FB [act 440]. If the address is within FB 220-1's range (or if passed, within the range of another FB such as 220-2), the FB may process the address [act 450].

In such address processing the FB may compute an associated index, Index=Address−Base, via computation unit 330. For this computed index value, a bit may then be set in that FBs Ping scoreboard 320. As indicated by the return arrows from acts 440 and 450, such address processing may continue until all addresses have been associated with the appropriate FB 220.

At the end of this sequence 400, all FBs 220 may have their Ping address fences 310 valid, as well as their PING scoreboards 320 updated with the addresses that they are allowed to use. In some implementations, these index addresses may start at zero and are incremental counts (0, 1, 2, . . . ) to the last address in the sequence, although the claimed invention is not limited in this regard.

If a bit is set in the respective scoreboard 320, this denotes that that particular address is not "in flight" (e.g., in transit to another destination). Thus, a zero (e.g., an un-set bit) in the scoreboard 320 (within a particular address fence region) may denote that that particular address is in flight. An address that is not in flight may be reclaimed and re-used for a new output buffer destined for URB 250. An address that is in flight, by contrast, may not be reclaimed for use as part of a new output buffer.

Although process 400 may appear to be a less straightforward way to set scoreboard 320 at startup, such a scheme may make repartitioning of address fences 310 similar to the scheme of the startup sequence. Optimizations are possible that do not issue addresses in front of FB 220-1 to seed the pipeline with these addresses. The particular scheme 400 above is described for ease of understanding, and its details do not necessarily limit the claimed invention.

Figure 5:
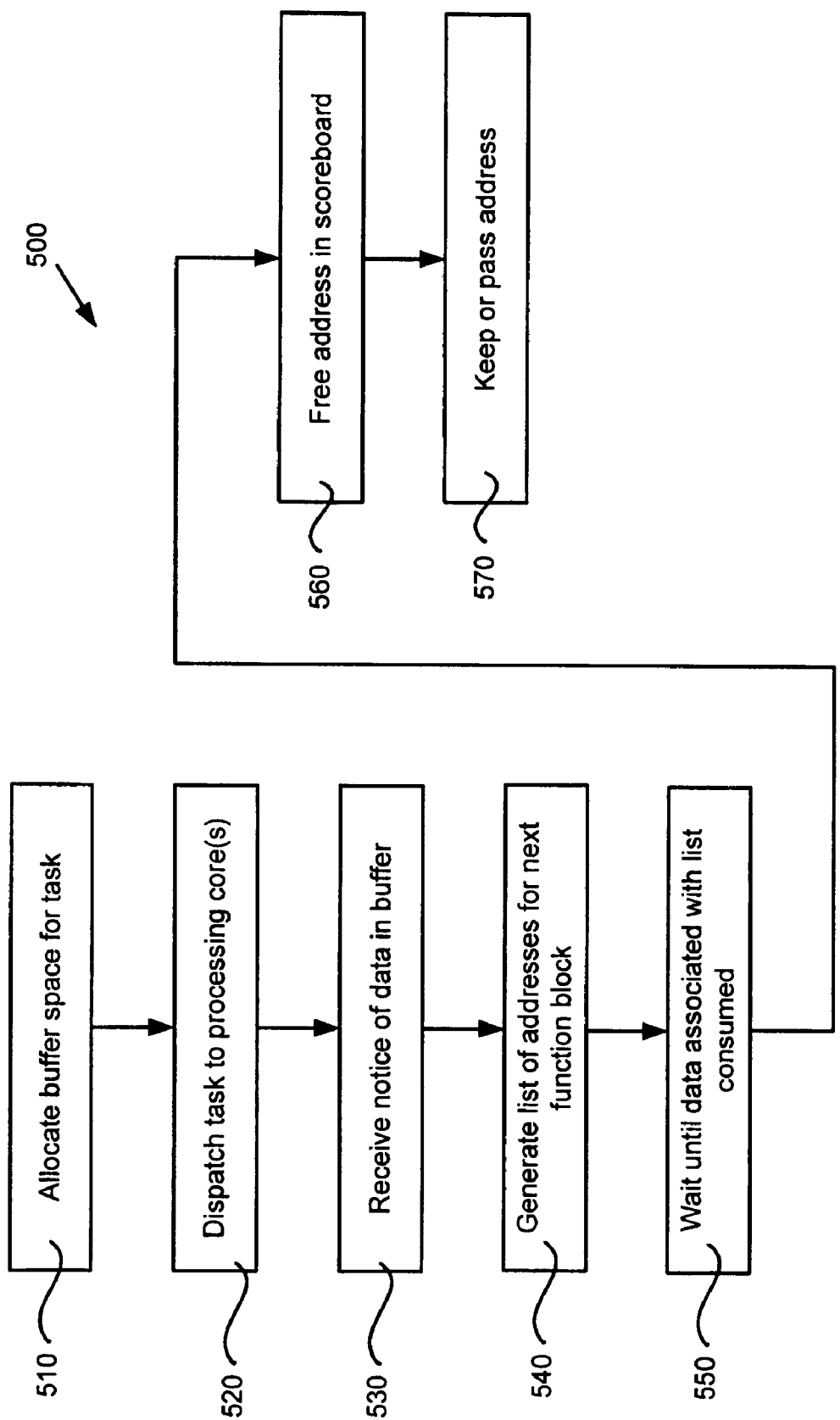
FIG. 5 is a flow chart illustrating a process of utilizing addresses in a buffer by function blocks.

FIG. 5 is a flow chart illustrating a process 500 of utilizing addresses in buffer 250 by function blocks (FBs). After the initialization sequence 400, FB 220-1 may set its scoreboard read pointer at zero. FB 220-1 may receive a task (e.g., a function or part of a function) from the command stream (e.g., command parser 210). Based on the buffering requirements (e.g., amount of space needed in URB 250) for this task, FB 220-1 may allocate such space in URB 250 [act 510].

In act 510, for example, FB 220-1 may store the current scoreboard read pointer into a register (e.g., a Working Pointer (WP)) along with the desired number of entries (e.g., a Working Count (WC)) in URB 250 for the task. Although not explicitly shown in FIG. 3, the WP and WC registers may be included in scoreboard 320 in some implementations. FB 220-1 may check whether scoreboard 320 has "Working Count" contiguous ones set, beginning at its scoreboard read pointer. If there are not that many contiguous ones set in scoreboard 320, FB 220-1 may waits until such a number become set. If such "working count" space is available, however, FB 220-1 may clear the bit at the current read pointer, and may advance the scoreboard read pointer by one. Such clearing and advancing may be repeated until the number of entries in URB 250 needed for the task (e.g., the number in WC) are allocated, completing act 510. Other implementations of act 510 are possible, and the above is presented primarily for ease of understanding.

The address(es) in URB 250 corresponding to the entries in scoreboard 320 may be computed from the Working Pointer via the address computation unit 330 as follows: URB Address=WP+Top, where Top is obtained from the active (e.g., Ping or Pong) address fence 310. If processing core(s) 140 require more then one return address, the above calculation may be repeated for multiple return addresses. These return addresses in URB 250 may be issued to processing core(s) 140 as the return addresses upon completion of computation for this portion of the task [act 520]. Other task-related information may also be dispatched by FB 220-1 to processing core(s) 140 in conjunction with act 520.

All FBs 220, after dispatching work to processing core(s) 140, may be signaled back by URB 250 when their respective data has returned to URB 250 after processing. Such signaling may occur automatically by URB 250 when the data is written into URB 250. FB 220-1, for example, may receive such a notification via LPBI 240 [act 530].

After receiving a notice that its data is in buffer 250 in act 530, FB 220-1 may generate a list of addresses for a downstream function block (e.g., FB 220-3) to use as its inputs [act 540]. In general, FB 220-*n* may generate a list of addresses+counts associated with URB 250 for the next FB 220-(*n*+*x*) to consume. The format of such an address list message may include the starting URB address and the word count. These addresses (and word counts) may be transmitted in FIFO (first in, first out) fashion to the neighboring, downstream function block (e.g., FB 220-(*n*+1)) over LPBI 240. If FB 220-(*n*+1) is a null function (e.g., is not being used for a given task), it may pass the information along until it reaches the next function block 220 in the task, FB 220-(*n*+*x*).

After FB 220-(*n*+*x*) has consumed the data pointed to by the URB addresses for the complete word count, the corresponding entry in scoreboard 320 in the sending FB 220-*n* may be "freed." Hence, FB 220-*n* may wait for the data associated with the list of addresses that it sent to be consumed by the next FB 220-(*n*+*x*) [act 550]. The term "consumed," as used herein, denotes that the addresses in question have been read from URB 250. It should be noted, however, that such address(es) may be considered to be consumed, but still may be in flight to another destination FB 220. For example, if the address has been read by a FB 220 that is not its ultimate destination, it may be considered consumed while still being in flight to its destination.

After an address has been consumed by another FB 220, FB 220-*n* may put the address back into the free list on its scoreboard 320 (e.g., it may "free" the address) [act 560]. Such "free" entry may be available for re-use in new return buffering operations in URB 250. To free an address, its index in scoreboard 320 may be calculated by computation unit 330 as follows: Index=URB Address−Active Top Fence. Such index calculation may be performed for all the "count" number of addresses associated with this first address. This expansion of an address plus count number may be referred to as "atomization." For example, an address of 10 and a count of 4 may be atomized into addresses 10, 11, 12, and 13. Next, the particular values of scoreboard 320 at the set of indices (e.g., for address+count) may be set to indicate that the addresses are free as follows: Scoreboard[Index]=1.

Upon receiving a "free" URB address and count (e.g., either self-generated or received via the Northbound or Southbound LPBI 240) FB 220-*n* may compare the address to its present active Fence 310's Top/Bottom pair and either keep the information or pass it North or South as appropriate over the LPBI 240 [act 570]. If the address (ignoring the word count) lies within that FB 220's Top/Bottom range, it is kept by that function block. If the address (ignoring word count) is less then that FB 220's Top value, it may be passed up through the Northbound LPBI 240; and if it is greater then the FB 220's Bottom value, it may be passed down the Southbound LPBI 240. Making the compare and decision to pass the address up or down in act 570 after atomization of the "free" URB+Count information in act 560 is intentional and allows for dynamic changes of fence 310 without needing to flush all of the FBs 220. Such also allows fences 310 to move between previous contiguous URB allocations, as will be described further below.

Although described primarily with regard to FB 220-1, process 500 may be performed in a similar manner by other function blocks, such as FB 220-2, FB 220-3, etc.

In some implementations, a FB 220 may issue the same URB 250 entry (and word count) to a downstream FB 220 multiple times. For example, some FBs 220 may use URB 250's entries as a cache, and a cache hit may entail a given URB entry be read more then once by another FB. Thus, that URB entry may be outstanding multiple times. Scoreboard 320, which denotes whether an address is in flight, should not treat such an entry as "free" until it has been consumed multiple times.

Hence, in some implementations, certain FBs 220 may maintain separate bookkeeping to track how many "freed" instances are needed before the address(es) can be repopulated into the scoreboard 330. Those function blocks 220 that have this behavior may include a mechanism to count up every time a given URB entry is issued, and a complementary mechanism to count down every time a given URB entry is "freed." Although not explicitly illustrated, in some implementations, such counting mechanism may be included in scoreboard 320 and/or state machine 340. This counting mechanism need only keep track of the base URB address that it issues, and not all of the associated entries in URB 250 (e.g., address+Count), if the count field remains the same.

Having described process 500 of utilizing addresses in a memory, dynamic reallocation of the memory among functions will now be discussed. At some point, it may be time for FBs 220 to "change state" (e.g., when one or more FBs 220 is added to or deleted from a given functional chain or pipeline). For example, given a pipeline configuration of FBs 220 (i.e., a vertex shader followed by a tessellator, followed by clipping, setup and a windower), there is presumably an ideal partitioning of URB 250 across the function blocks 220 in this configuration. For a new pipeline configuration (e.g., a vertex shader followed by a geometry shader, followed by a clipper, setup and windower, or another configuration of FBs 220 such as a vertex shader followed by the clipper, setup and the windower), there may be a different ideal partition of URB 250 among FBs 220. Such a change in state typically may involve a re-partitioning of URB 250 among FBs 220 (e.g., a change of address fences within FBs 220).

One way to accomplish such re-partitioning may be to way wait until each successive FB 220 is flushed of data before changing address fences. Such a scheme, however, would result in an "implied flush" where the whole pipeline would be delayed in changing state while successive FBs 220 are flushed. Another way to re-partition would be to start passing addresses from one FB 220 according to its new address fences, but such a scheme may deadlock if there is only one "southbound" channel and if such is flow controlled.

According to some implementations, to avoid deadlock while concurrently changing state and processing within the new state, the first FB 220 does not wait for the downstream FBs 220 to flush. Nor does it wait until scoreboard 320 of any stage is populated with all 1's (e.g., is cleared). Addresses from the old state may remain in transition during the state change, but the FBs 220 do not blindly keep passing addresses up and down. Instead, an address may flow up to complete its normal flow from the previous state while other addresses are also passed through the system to remap them into the new state. As will be described further, HPBI 230 facilitates such dynamic state change (e.g., re-partitioning of memory) without deadlock.

Figure 6:
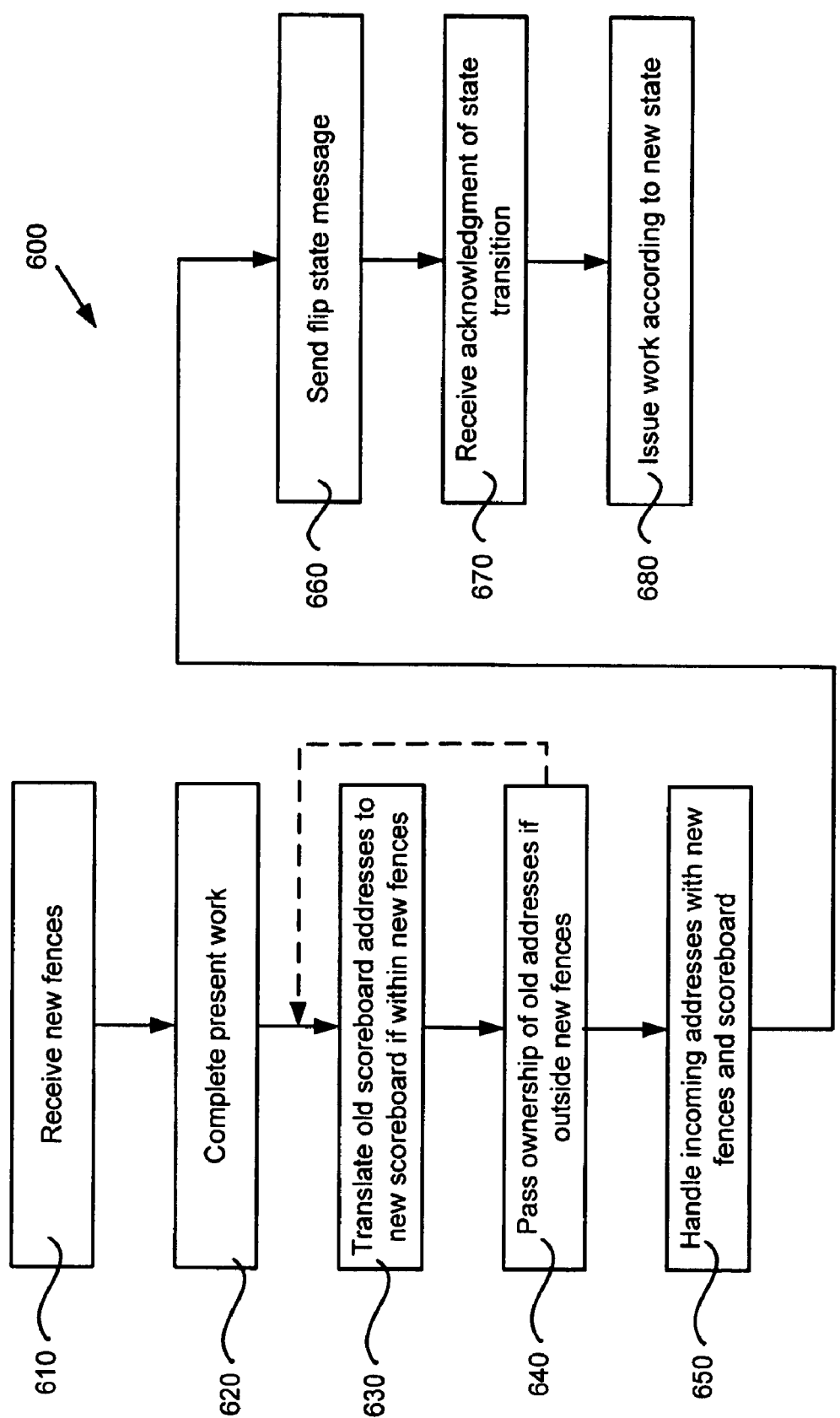
FIG. 6 is a flow chart illustrating a process of dynamically changing address fences by function blocks.

FIG. 6 is a flow chart illustrating a process 600 of dynamically changing address fences by a function block. Although described with regard to the first function block (e.g., FB 220-1) in a chain or pipeline, process 600 may be performed by successive FBs 220 to complete dynamic reallocation of URB 250.

Processing may begin with FB 220-1 receiving a new set of address fence values [act 610]. These new values may be stored in either the ping or pong portion of address fence 310, depending on which currently houses the fences for the present operating state. A new list of Top/Bottom fences for all FBs 220 may be issued by the command stream, and FB 220-1 may take the first Top/Bottom set from the list and puts them in its (e.g., pong) address fence 310. FB 220-1 then may pass the remainder of the Top/Bottom fences to the next FB 220 (e.g., FB 220-2) via HPBI 230.

Processing may continue with FB 220-1 completing the processing/work that it started before it received the new address fences [act 620]. Such work may include data to process that has not yet returned to URB 250, but may not include data in URB 250 that is associated with FB 220-1 (e.g., in scoreboard 320). It is impermissible for FB 220-1 to "retire" an address into its new scoreboard (e.g., "pong" portion of scoreboard 320) while it is still working on its old state. If FB 220-1 is still working in its old state, any address that is not tagged as being passed for ownership should be fence compared against FB 220-1's present working fences and passed up, down, or kept based on the old working state.

After FB 220-1 finishes its present work it may scan its old scoreboard 320 starting at zero for entries allocated in the old state. For each such entry in the scoreboard it may perform the address translation to Address=Scoreboard Index+Old Top. If the Address is within the new Top/Bottom fences it performs the translation Index=Address−New Top and sets the bit in the new scoreboard 320 at that index [act 630].

If the address is below the Bottom value or above the Top value of the new address fence, FB 220-1 may pass the address downward or upward via HPBI 230 with a "passing ownership" indicator [act 640]. Note that the Top value comparison is only relevant for FBs below the top FB 220-1. Addresses that have been compared with the new fence 310 and passed may be tagged with a "passing ownership" indicator. Such an a passing ownership indicator may indicate to other FBs 220 (e.g., FB 220-2) that this address should not be passed back to FB 220-1, but instead should be compared with the receiving FB's new address fences (and set a corresponding entry in the receiving FB's new scoreboard if within the new fences). For addresses that have been translated in act 630 or passed in act 640, FB 220-1 may clears the corresponding entry in its old scoreboard 320 (e.g., by setting it to zero). The dotted line in FIG. 6 indicates that acts 620 and 640 may be repeated for all entries found in old scoreboard 320.

If old scoreboard 320 has a zero at a given index (e.g., indicating no address), no operation may be performed in acts 630 and 640 on that index. The index may incremented, passing the zero. If the address calculation is performed and the entry maps into the new scoreboard 320, the FB 220 may write a zero to that new scoreboard entry instead of just passing over it. Note that as soon as old scoreboard 320 is scanned FB 220-1 may reset the scoreboard read pointer to zero for the new scoreboard and may start looking for contiguous 1's to generate a new payload requiring entries in URB 250.

Concurrently with acts 630 and 640, addresses may be arriving at FB 220-1 via the northbound LPBI 240. These arriving addresses may be handled by FB 220-1 with regard to the new fences 310 and scoreboard 320 [act 650]. For example, if an incoming address maps within the new Top/Bottom fences 310, it may be referenced to the new scoreboard index and the new scoreboard entry may be set to 1. If the address is outside of new fence 310's range (in the case of first FB 220-1, it can only be larger then the Bottom value), the address may be sent back down to FB 220-2 (or whichever is the next FB 220 in the pipeline) on HPBI 230 with the "passing ownership" indicator.

When FB 220-1 is ready to send a first workload for the new state to the next FB 220 (e.g., FB 220-2), it sends a "Flip State" message on the southbound LPBI 240 [act 660]. Such a flip state message instructs the next FB in the pipeline to begin process 600. Although shown after act 650, act 660 may, in some implementations, occur immediately after act 620. When FB 220-2 sees this message and is done with the previous state's work (e.g., after completing act 620) it may issue another "Flip State" message in order on its southbound LPBI 240.

To prevent mis-timed state changes, it is desirable a mechanism to prevent FB 220-1 from issuing data according to the new state before the rest of the engine/pipeline is ready. Therefore, FB 220-1 may wait until it receives some signal from the most downstream unit (e.g., FB 220-n, where n denotes the last unit in the pipeline), that indicates it has gotten to its new state [act 670]. In some implementations, when the most downstream FB 220-n acts on the "Flip State" it received via its LPBI 240, it may send an acknowledgment signal back to FB 220-1 via the northbound HPBI 230. All other FBs 220 in the pipeline may ignore this message. FB 220-1 may not, in such implementations, issue a new state packet till the acknowledgment packet is received. Other acknowledgment and/or delay mechanisms, however, are both possible and contemplated.

FB 220-1 may then begin to issue work in the new state [act 680].

Process 600 will now be described with regard to a downstream unit, such as FB 220-2. FB 220-1 may have changed state while FB 220-2 may still be in the old state. Any address FB 220-2 "frees" that falls into its old fences naturally fall into its old scoreboard. Any addresses that FB 220-2 "frees" that fall outside of its old fences are passed upward using the northbound LPBI 240. This is also true of any addresses FB 220-2 receives via its northbound LPBI 240 from a downstream unit (e.g., FB 220-3). When FB 220-2 is done dispatching its work from the old state it may perform acts 630 and 640, scanning its old scoreboard 320 and passing addresses as necessary using the northbound or southbound HPBI 230 with "passing ownership" semantics. Process 600 may be repeated by the remaining units 220 to dynamically re-allocate URB 250 among them.

FIG. 7 illustrates exemplary message formats on HPBI 230 and LPBI 240. Message 710 illustrates a format of a message that is southbound (e.g., to a successive FB 220) on HPBI 230. Message 720 illustrates a format of a message that is northbound (e.g., to a prior FB 220) on HPBI 230. Similarly, messages 730 and 740 illustrate formats of messages that are respectively southbound and northbound on LPBI 240.

It may be noted that all of the URB addresses in messages 710-740 are illustrated as 10 bit fields. This data length assumes that URB 250 will have 1024 entries or less, and may differ based on the size of the memory addressed. This may be adjusted if desired should URB 250 or other memory to be re-partitioned need more or less address space.

As described herein address fence mechanisms 310 may be incorporated in each of function blocks 220. Each function block 220 may use, for its outputs into URB 250, any of the addresses within its own fence range. These addresses are passed to downstream functions 220 for subsequent reads and for further processing. After the subsequent read is performed the address is either kept by that function block 220 (e.g., when the address is within that function block's address range), passed down (e.g., when the address is greater then that function block's address range), or passed up (e.g., when the address is less then that function block's address range). When a state change in function blocks 220 occurs, address fences 310 may be dynamically reconfigured without deadlocks or needing to completely flush function blocks 220 of associated data.

The foregoing description of one or more implementations provides illustration and description, but is not intended to be exhaustive or to limit the scope of the invention to the precise form disclosed. Modifications and variations are possible in light of the above teachings or may be acquired from practice of various implementations of the invention.

For example, although the memory reallocation scheme herein has been described with regard to return buffer 250 and function blocks 220, it is applicable to dynamic reallocation in memories by/for computational functions and/or threads generally. Also, other schemes are both possible and contemplated for the address sorting and bookkeeping functions performed by address fences 310 and scoreboards 320 that were described herein. Further, although address fences 310 assume contiguous addresses for a function block 220, discontiguous addresses in buffer may also be associated with a given function block 220 with different association logic than fences, if desired.

Moreover, the acts in FIGS. 4-6 need not be implemented in the order shown; nor do all of the acts necessarily need to be performed. Also, those acts that are not dependent on other acts may be performed in parallel with the other acts. Further, at least some of the acts in this figure may be implemented as instructions, or groups of instructions, implemented in a machine-readable medium.

No element, act, or instruction used in the description of the present application should be construed as critical or essential to the invention unless explicitly described as such. Also, as used herein, the article "a" is intended to include one or more items. Variations and modifications may be made to the above-described implementation(s) of the claimed invention without departing substantially from the spirit and principles of the invention. All such modifications and variations are intended to be included herein within the scope of this disclosure and protected by the following claims.

What is claimed:

1. A computer-implemented method using a computer program stored on a computer readable storage medium comprising instructions for:
   distributing a first set of addresses in a memory among a first set of functions in a first pipeline;
   operating, by the first set of the functions in the first pipeline, on data using the first set of addresses; and
   redistributing said first set of addresses in the memory among a second set of functions in a second pipeline without waiting for the first set of functions to be flushed of data.

2. The method of claim 1, wherein the distributing includes:
   distributing a set of address fences among the first set of functions.

3. The method of claim 2, wherein the distributing further includes:
   determining whether an address is within an address fence,
   processing the address if the address falls within the address fence, and passing the address to another function if the address fall outside of the address fence.

4. The method of claim 1, wherein the operating includes:
allocating space in a memory for a processing task,
dispatching the task to a processor, and
generating a list of addresses in the memory corresponding to the task for a next function.

5. The method of claim 4, wherein the operating further includes:
waiting until data associated with the list of addresses is consumed, and
freeing the list of addresses in a scoreboard.

6. The method of claim 1, wherein the redistributing includes:
distributing a new set of address fences among the second set of functions,
translating addresses from an old scoreboard to a new scoreboard if the addresses fall within a new address fence, and
passing ownership of the addresses in the old scoreboard if the addresses fall outside a new address fence.

7. The method of claim 6, wherein the redistributing further includes:
sending a message to a next function to begin the translating and the passing for its old and new scoreboards with regard to its new address fence.

8. The method of claim 1, further comprising:
operating, by the second set of functions in the second pipeline, using the different ranges of addresses after the redistributing is performed.

9. A computer-implemented method using a computer program stored on a computer readable storage medium comprising instructions for:
partitioning a memory among a number of processes using address fences;
dynamically reassigning memory space from one of the number of processes to another one of the number of processes while the number of processes continue to use the memory.

10. The method of claim 9, wherein the dynamically reassigning includes:
receiving a new set of address fences,
retaining ownership of an address if the address falls inside of the new set of address fences, and
passing ownership of the addresses if the address falls outside of the new set of address fences.

11. The method of claim 10, wherein the passing ownership includes:
sending the addresses to another process over a high priority bus.

12. The method of claim 10, wherein the redistributing further includes:
sending a message to a next process to perform the retaining and the passing for its corresponding addresses with its new set of address fences.

13. A computer-implemented method using a computer program stored on a computer readable storage medium comprising instructions for:
allocating different amounts of physical memory from amounts previously allocated in a graphical processing device among a set of fixed functions without performing a complete flush of data associated with the set of fixed functions.

14. The method of claim 13, wherein the set of fixed functions continues to use and access the physical memory during the allocating.

15. The method of claim 13, wherein the allocating includes:
transferring addresses in the memory between an old set of address fences and a new set of address fences in the set of fixed functions.

16. The method of claim 15, wherein the allocating includes:
passing ownership of addresses in the memory between fixed functions on a high priority bus according to the new set of address fences.

* * * * *

UNITED STATES PATENT AND TRADEMARK OFFICE
CERTIFICATE OF CORRECTION

PATENT NO.      : 7,603,544 B2
APPLICATION NO. : 11/224643
DATED           : October 13, 2009
INVENTOR(S)     : Thomas A. Piazza It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 903 days.

Signed and Sealed this

Fifth Day of October, 2010

David J. Kappos
*Director of the United States Patent and Trademark Office*